J. T. SLOCOMB.
MICROMETER GAGE.
APPLICATION FILED JAN. 4, 1916.

1,226,396.

Patented May 15, 1917.

Inventor:
John T. Slocomb.
By his Attorney
George H. B. Green Jr.

UNITED STATES PATENT OFFICE.

JOHN T. SLOCOMB, OF PROVIDENCE, RHODE ISLAND, ASSIGNOR TO J. T. SLOCOMB COMPANY, OF PROVIDENCE, RHODE ISLAND, A CORPORATION OF RHODE ISLAND.

MICROMETER-GAGE.

1,226,396.              Specification of Letters Patent.        Patented May 15, 1917.

Application filed January 4, 1916. Serial No. 70,112.

*To all whom it may concern:*

Be it known that I, JOHN T. SLOCOMB, a citizen of the United States, residing at Providence, in the county of Providence and State of Rhode Island, have invented certain new and useful Improvements in Micrometer-Gages; and I do hereby declare the following to be a full, clear, and exact description of the invention, such as will enable others skilled in the art to which it appertains to make and use the same.

The present invention relates to micrometer gages and more particularly to a micrometer gage for measuring the thickness of the wall of pipe or tubing.

Difficulty has heretofore been experienced in obtaining accurate measurements of the thickness of the wall of pipe or tubing owing to the inadaptability of the micrometer gages now in common use for making such measurements, particularly with the smaller sizes of pipe or tubing, or at a sufficient distance from the end of the tube to avoid the variations in thickness which commonly occur at or immediately adjacent the end of the pipe or tubing and which are the result of imperfect methods of manufacture, or of careless handling, or of cutting, threading, or other operations.

One of the objects of the present invention is to provide a micrometer gage which is particularly adapted for measuring the thickness of wall of the smaller as well as of the larger sizes of tubing. A further object is to provide a micrometer gage which is adapted to make such measurements at a sufficient distance from the end of the tube to avoid the local variations in thickness commonly occurring therein.

To these ends the invention consists in the micrometer gage hereinafter described and claimed.

Figure 1:
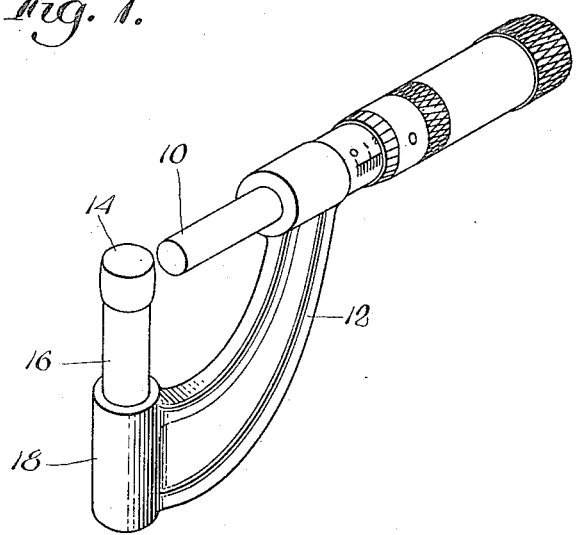
Figure 2:
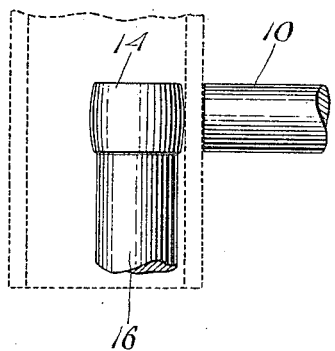

The various features of the invention are illustrated in the accompanying drawing in which Figure 1 is a perspective view of the improved micrometer gage; and Fig. 2 is a detail view showing the anvil and micrometer spindle of the gage in operative position for measuring the thickness of the wall of a pipe or tube.

The gage illustrated in the drawing consists of a micrometer spindle 10 adjustably mounted in a frame 12 and an anvil 14 supported on the end of a stem 16 which is rigidly connected with the frame. The adjustable mounting of the micrometer spindle 10 in the frame and the scale for indicating the position of the micrometer spindle are substantially the same in their construction and operation as that shown in my prior patent, No. 559,820, dated May 12, 1896.

In order to adapt the gage for pipe or tubing measurement, the anvil 14 and stem 16 are circular in cross section, the stem 16 being rigidly mounted in the frame with its axis perpendicular to the axis of the micrometer spindle. Preferably, as shown in the drawings, the stem and anvil are integral and are formed separate from the frame, and the stem is then rigidly secured in the sleeve or boss 18 of the frame, thus enabling the stem and anvil to be finished to better advantage and to be made of tool steel and hardened, while the frame remains soft. Furthermore, by turning the stem in the frame, a true and unworn surface can be brought to bear on the work to be measured. The distance from the top of the sleeve 18 to the center of the anvil is comparatively great so that the anvil may be projected well within the end of the pipe and beyond the area in which the irregular formation of the end of the pipe occurs.

Preferably the anvil 14 presents not only a convex surface transversely of the pipe or tubing to be measured, but also, as shown in Fig. 2, a convex surface longitudinally of the pipe or tubing to be measured, thus in use making a one-point contact on the interior of the tube.

In the preferred form of the present invention the diameter of the stem 16 is slightly less than the largest diameter of the anvil 14 in order to avoid contact between the stem and the interior of the tubing with the possibility of inaccuracy of measurement.

The diameter of the anvil and stem may be varied as occasion requires, the diameter of both, however, being kept as large as the character of the work will permit in order to obtain the greatest rigidity with resulting accuracy of measurement.

Having thus described my invention, what is claimed as new, is:

1. A micrometer gage for measuring the thickness of tubing, having, in combination, a rigid, integrally-formed frame having a recess at each end thereof, a micrometer spindle adjustably mounted in one of said recesses, an anvil, a supporting stem for the anvil, both anvil and stem being circular in cross section with a common axis, the anvil being of greater diameter than the stem, and the end of the stem being normally held rigidly at right angles to the spindle in the other recess in the frame, and adjustable therein to bring a new surface on the anvil opposite the spindle.

2. A micrometer gage for measuring the thickness of tubing, having, in combination, a rigid, integrally-formed frame comprising a curved member having a recess at one end and a cylindrical boss at the other end provided with a cylindrical recess, a micrometer spindle adjustably mounted in the first mentioned recess at right angles to the recess in the boss, an anvil having a convex face located opposite the end of the spindle, and a cylindrical supporting stem for the anvil normally held rigidly in the recess in the boss, the contact surface of the anvil being outside the adjacent surface of the stem.

3. A micrometer gage for measuring the thickness of tubing having, in combination, a frame, a micrometer spindle adjustable in the frame, an anvil having a spheroidal surface opposite the spindle, and a cylindrical supporting stem for the anvil rigidly mounted in the frame at right angles to the spindle and of less diameter than the anvil.

4. A micrometer gage for measuring the thickness of tubing, having, in combination, a frame comprising a curved member, and a cylindrical boss integrally-formed therewith at each end, the axis of said bosses being at right angles to each other, a micrometer spindle adjustably mounted in one of said bosses, an anvil located opposite the end of said spindle, and a support for the anvil carried by the other boss and normally rigid therewith, the contact face of the anvil being offset from the adjacent surface of the support toward the spindle.

JOHN T. SLOCOMB.

Witnesses:
T. C. SHORT,
F. T. HILLS.

Copies of this patent may be obtained for five cents each, by addressing the "Commissioner of Patents, Washington, D. C."